US006576590B2

(12) United States Patent
Rosenberg et al.

(10) Patent No.: US 6,576,590 B2
(45) Date of Patent: Jun. 10, 2003

(54) MATERIALS FOR THE SEPARATION OF COPPER IONS AND FERRIC IRON IN LIQUID SOLUTIONS

(75) Inventors: Edward Rosenberg, Missoula, MT (US); Robert J. Fischer, Hamilton, MT (US)

(73) Assignee: University of Monatan, Missoula, MT (US)

( * ) Notice: Subject to any disclaimer, the term of this patent is extended or adjusted under 35 U.S.C. 154(b) by 305 days.

(21) Appl. No.: 09/776,303

(22) Filed: Feb. 1, 2001

(65) Prior Publication Data

US 2002/0139753 A1 Oct. 3, 2002

(51) Int. Cl.⁷ ................................................ B01J 20/22
(52) U.S. Cl. ..................................................... 502/401
(58) Field of Search ................................ 502/401, 402, 502/403, 404

(56) References Cited

U.S. PATENT DOCUMENTS

| | | | |
|---|---|---|---|
| 3,998,924 A | | 12/1976 | Jones et al. |
| 4,666,683 A | | 5/1987 | Brown et al. |
| 4,732,887 A | * | 3/1988 | Obanawa et al. ........... 502/402 |
| 5,102,640 A | | 4/1992 | Schlapfer |
| 5,997,748 A | | 12/1999 | Rosenberg et al. |
| 6,011,196 A | * | 1/2000 | Wang et al. ................ 604/368 |

* cited by examiner

*Primary Examiner*—Stanley S. Silverman
*Assistant Examiner*—Edward M. Johnson
(74) *Attorney, Agent, or Firm*—Saliwanchik, Lloyd & Saliwanchik

(57) ABSTRACT

A silica-polyamine based extraction material removes selected transition metal ions from solution in the presence of iron ions. The silica-polyamine base is a reaction product of a polyamine and a covalently anchored trifunctional hydrocarbylsilyl that yields non-crosslinked amino groups to which a pyridine function group is attached. The extraction material is particularly useful in selectively removing copper from low concentration, low pH leach solutions separating copper from ferric iron or chloride ions. The product is a durable, high capacity extraction material that selectively captures copper at high flow rates and releases that copper into highly concentrated solutions.

53 Claims, 4 Drawing Sheets

MATERIALS FOR THE SEPARATION OF COPPER IONS AND FERRIC IRON IN LIQUID SOLUTIONS

The subject invention was made with government support under a research project supported by the National Science Foundation Grant No. 9961006. The government has certain rights in this invention.

BACKGROUND OF THE INVENTION

In recent years, hydrometallurgical processes for the extraction of copper from ore have supplanted traditional pyrometallurgical methods. Pyrometallurgical methods involve the use of fire to extract pure metals from ore by smelting. Increased awareness of the environmental impact of these processes however have lead to an increase in environmental standards and the concomitant increase in the capital cost and operating cost of smelter equipment. Hydrometallurgical techniques have thus become a preferred method for the extraction of copper from copper ores.

Hydrometallurgical techniques involve the extraction or leaching of copper from copper ores into aqueous leach solutions. Ore is treated with aqueous solutions which dissolve the copper from the ore. Pure copper is then recovered from the leach solutions by solvent extraction and then electrowinning. Electrowinning is a process in which copper is plated onto an electrode from an aqueous solution containing high concentrations of isolated copper ions.

An efficient leaching system uses dilute solutions of sulfuric acid to extract copper from copper oxide and oxide/sulfide containing ores. Ferric (iron(III)) ions are often added to the acid solutions to improve the efficiency of the leaching process by oxidizing the copper (I) to its more soluble copper (II) form and sulfide to sulfur. The resulting leach solutions contain not only soluble copper and sulfate at low pH but they also contain a variety of metals including iron, manganese, aluminum, magnesium and molybdenum of which high concentrations of iron is the primary concern. Another efficient leaching system is chloride leaching. Chloride leaching is particularly effective at leaching copper from sulfide containing copper ores such as chalcopyrite. In this process ferric chloride is used as the source of chloride ions to complex the copper and to oxidize the copper (I) to copper (II) contributing to a high iron concentration in the leach solution.

The copper concentrations in the leach solutions can range from about, 1 gram/liter (g/L) to about 50 g/L with typical concentrations falling between 1 g/L and 6 g/L. The pH of these solutions ranges between 1.2 and 2.2 pH units. Copper concentrations in a typical electrowinning tank however are between about 30 g/L and 35 g/L. It is therefore necessary to extract and concentrate the copper in these mixed acid leaches before purifying the copper by electrowinning.

The technology most widely used to extract and concentrate the copper in these mixed acid leach solutions is solvent extraction. In the solvent extraction process water soluble heavy metal salts are complexed with organic ligands to produce low polarity or neutral charge complexes that have limited solubility in water but are highly soluble in an organic solvent (organic phase) which is immiscible with water. Ligands such as aryl-hydroxyoximes are used for this purpose. These ligands selectively bind to the copper ions in the mixed metal solutions to create a charge neutral copper complex. These complexes are soluble in an organic solvent. In this way copper is selectively transferred into the organic phase. Salts can also be added to the aqueous phase to force the metal complexes into the organic phase. Other variations of this process incorporate ligands which form micelles in the aqueous phase or ligands which stay in the organic phase and are polar on one end and so are drawn to the aqueous-organic interface where they react with the metals to form non-polar organic soluble complexes soluble in the organic phase. When the organic phase becomes saturated with relatively high concentration of complexed copper, the copper must be decomplexed and released into the clean aqueous phase for final electrowinning. Some of the problems associated with the solvent extraction process include the necessity to execute multiple wash steps of the organic phase when chloride leach solutions are being treated; the need to add equilibrium modifiers to facilitate the uptake into and release of copper from organic phase and the formation of "crud" that forms at the aqueous-organic phase interface causing equipment fouling. Organic solvent and ligand loss further complicates the process. The primary drawback with this technology however is the organic phase. The solvents used in the organic phase include benzene, toluene, chloroform, hexanes and octanes among others. Kerosene is the solvent of choice for most large scale production mining operations. These solvents are typically toxic, flammable, and have adverse environmental inpacts. Solvent loss during the extraction process extracts a negative economic toll. Ligand and equilibrium modifier loss is also an environmental and economic problem associated with the solvent extraction process.

An alternative to the solvent extraction processing of hydrometallurgical solutions is the use of swellable resin beads as an extraction medium. Swellable resin beads have a long history as the matrix on which ion exchange and metal ion chelation technologies are built. These swellable resin beads are generally lightly crosslinked polystyrene which is modified to accommodate the addition of pendant ion exchange or chelating ligands and occasionally other groups to decrease the hydrophobicity of the polymer. Copper selective ligands have been chemically bonded to polystyrene beads for the processing of copper leaches. There are however problems associated with using swellable resin bead technology in high throughput operations. Lightly crosslinked polystyrenebeads are highly porous and the extractant ligands are bound throughout the polymer matrix. Many, if not most, of the ligands are buried deep within the polymer bead. The feed solution must diffuse through the bead to reach these sites for extraction to take place. The required process flow rates are often much faster than the rate of diffusion through the resin bead. For this reason a material that may have a high capacity in a batch application where the extractant and the feed solution have long contact times has greatly reduced capacity in flow applications. Because of the porous nature of the resin beads they also have a tendency to collapse when subjected to the pressures generated by the fast moving solution in a column application. The beads at the exit end of the column flatten and pack more tightly together which in turn causes an increase in the backpressure of the system. This causes a decrease in metal ion capacity and necessitates periodic backwashing of the column thereby limiting the useful lifetime of the material. In addition, chloride is often present in the leach solution and will contaminate the strip solution. This contamination is not compatible with electrowinning. This is a problem with both the solvent extraction process and currently employed resin technologies.

From the foregoing it is apparent that the technical challenge posed in the recovery of high grade copper from low grade ore is to devise an efficient, environmentally safe method of selectively extracting copper from low concentration, low pH leach solutions to produce high concentration, high purity aqueous solutions suitable for electrowinning (i.e. free of ferric and chloride ions).

SUMMARY OF THE INVENTION

The invention is a matrix-polyamine based material that extracts and separates selected transition metal ions from iron (III) ions from a solution containing a mixture of metal ions. In a preferred embodiment, the subject extraction material selectively extracts copper (II) from low pH solutions in the presence of iron (III) ions. The matrix-polyamine based material is rigid and durable in order to withstand high throughput conditions and requires the use of no organic solvents in its use and only a few in its manufacture. In a particularly preferred embodiment, the matrix is silica gel which is washed with acid to maximize surface hydroxyl groups. The gel is then dried and partially rehydrated. The hydrated surface of the silica gel is reacted with a short chain trifunctional silane having hydrocarbon substituents containing 1-6 carbon atoms, trifunctional leaving groups on the silicon atom that provide sites for covalently bonding the hydrocarbylsilyl to the silica gel surface through Si—O bonds, and a terminal leaving group that provides a site for covalently bonding a polyamine to the hydrocarbylsilyl through carbon-nitrogen bonds. A polyamine is then reacted with the hydrocarbylsilyl formed from the silanization of the hydrated gel surface to form an aminohydrocarbyl polymer covalently bound to the silica gel surface. The silica-polyamine is then reacted with picolylchloride (2-chloromethyl pyridine) or with pyridine 2-carboxaldehyde to create a highly selective extraction material.

A three step high throughput system using the silica-polyamine extraction material of the subject invention is also described. The first step of the process selectively extracts copper from leach solutions containing high concentrations of ferric ions with no added solution modifiers. The second step purges the extracted copper of chloride ions using a saturated solution of sodium sulfate or a dilute sulfuric acid solution. Thirdly, the copper is stripped from the extraction material with sulfuric acid to yield a concentrated copper solution suitable for electrowinning. The column is ready to be reloaded after rinsing with water.

DETAILED DESCRIPTION OF THE INVENTION

Figure 1:
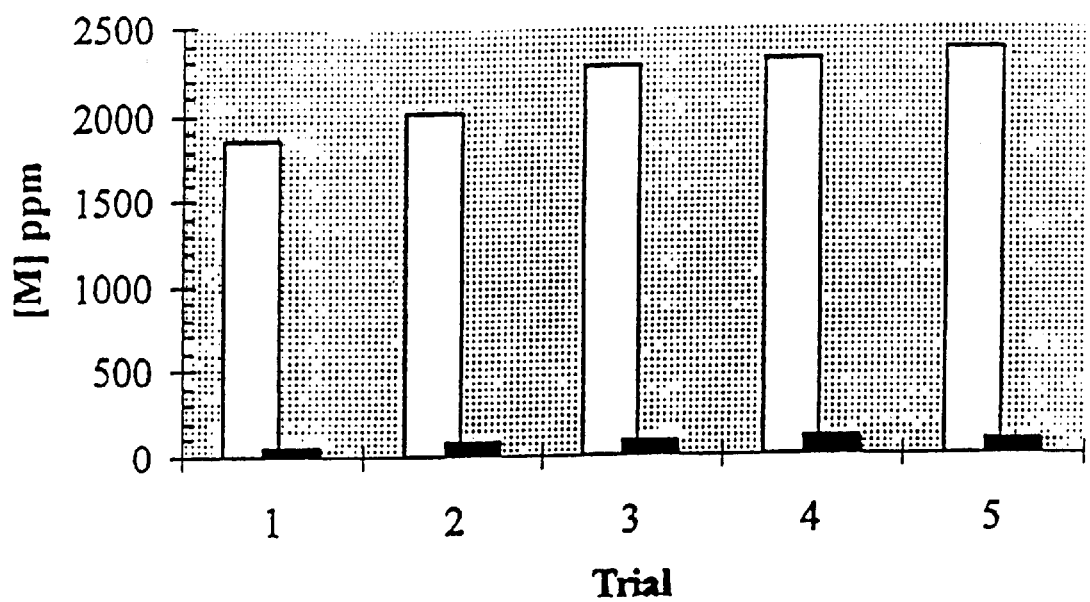
FIG. 1 shows the concentration of copper (II) and iron (III) remaining in the simulated mine leachate solution after being pumped through a column of silica-polyvinylamine/picolyl gel. □ Fe(III), ■ Cu(II)

The invention is a matrix-polyamine based material for the extraction of selected transition metals from iron (III) ions. In a particularly preferred embodiment, the matrix-polyamine based extraction material selectively extracts copper (II) ions from acidic solutions in the presence of iron (III) ions. Picolylchloride or pyridine 2-carboxaldehyde attached to a silica-polyamine base provides an extraction material that is highly selective for these copper ions.

The matrix-polyamine base is known and has been described in U.S. Pat. Nos. 5,695,882 and 5,997,748. These patents are herein incorporated by reference. The surface of the matrix is chemically treated so as to covalently bind the reaction product of a polyamine with a hydrocarbylsilyl, such as the preferred haloalkylsilyl, to the matrix surface. This can be accomplished, for example, by first reacting a short chain trifunctional silane having a hydrocarbon substituent containing 1–6 carbon atoms and a terminal leaving group, such as a haloalkyl trifunctional silane, with the surface of the matrix in a manner such that the hydrocarbylsilyl is covalently bound with the matrix surface and then reacting a polyamine, such as polyethyleneimine, with the hydrocarbylsilyl to bind the polyamine to the hydrocarbylsilyl. The step of reacting the polyamine with the hydrocarbylsilyl must be such that it will yield multisite bound, but non-crosslinked, amino groups.

Briefly, the matrix-polyamine base material is prepared by boiling the matrix in acid, drying and partially rehydrating the matrix surface. In the exemplified embodiment, the matrix is silica gel. The silica gel surface can be hydrated by applying a moisturized atmosphere, such as air passed through a saturated aqueous sodium bromide solution, to the surface in a controlled environment until a predetermined humidification has been attained as determined by the mass increase.

The hydrated gel surface is then contacted with the above-defined short chain trifunctional silane, such as a haloalkyl trifunctional silane, in the presence of an inert organic solvent. The reaction between the hydrated surface of the silica gel and the silane produces a hydrocarbylsily that is covalently bonded to the gel surface by siloxanyl (Si—O) groups. After the reaction between the hydrated surface and the silane, the silanized gel is rinsed with an inert organic solvent and dried.

The silanized and dried gel surface is then contacted with polyamine in the presence of an inert organic solvent or water to produce a multisite bound non-crosslinked polyamine coating on the matrix surface.

Suitable trifunctional groups on the silica of the silanizing agent include trichloro, trimethoxy, and triethoxy groups; trichloro being preferred. Suitable groups for the silanizing agent on the hydrocarbyl fragment include bromine, chlorine and iodine, tosylate, mesylate, brosylate, and triflate; bromine and chlorine being preferred. Suitable hydrocarbyl groups include short chain aliphatic hydrocarbons having 1–6 carbon atoms; propyl being preferred, based on pricing of the trichlorosilyl halide. A preferred molecular weight (M.W.) range for the polyamine is 300–60,000; with polyvinylamine or polyalylamine in that range being most preferred.

Any number of suitable support materials may be substituted in place of the silica gel for use as an extraction material; silica gel merely being preferred because of its availability in sizes particularly suitable for use in continuous-flow extraction processes.

A particularly preferred matrix-polyamine base material comprises an alkylated silica gel where the silica gel surface is first reacted with a haloalkyltrichlorosilane and, then that reaction product is further reacted with polyvinylamine to yield a polyvinylaminoalkylsilyl activated surface.

The sequence of formulating the matrix-polyamine base material has some critical components. First, the matrix surface is washed with an acid, for example, nitric acid, dried and rehydrated to insure that a monolayer of water overlays the surface. Second, the clean and hydrated surface must be silanized before the polyamine is brought into the reaction. Polyamine addition is commenced only after the silanization procedure has been completed. By silanizing the hydrated surface with a silane having a short chain hydrocarbyl substituent containing 1–6 carbon atoms and a terminal leaving group, the surface to the matrix material will be virtually completely covered by Srf-O—Si-hydrocarbyl groups, where Srf represents the matrix surface, and by lateral Si—O—Si bonds. Hydration of the surface promotes the formation of these lateral bonds. The result is a horizontally polymerized matrix surface, covalently bound to the surface by Si—O bonds and cross-linked by Si—O—Si bonds with essentially few or no —OH groups left unreacted on the matrix's surface. The short hydrocarbyl chains extend from the laterally polymerized silyl groups and not from the matrix surface, and are not themselves cross-linked. As a consequence, of this form of silanization, the hydrocarbylated matrix surface becomes hydrolytically stable in both high and low pH solutions. Polyamine addition to the cross-linked, silanized surface anchors, results in the substitution of amino groups onto the ends of short hydrocarbyl chains without destabilizing either the matrix surface or the covalent bonds with the hydrocarbyl substituent. In the context of a preferred process, employing a short chain trifunctional alkyl silane containing 1–6 carbon atoms, the result is a densely alkylated extraction material surface, that is optimal for bonding amino groups and for addition of functionalizing groups or ligands.

Selectivity for certain transition metal ions in the presence of ferric iron is achieved by the addition of a pyridine functional group to the matrix-polyamine base material. These pyridine functional groups can be a pyridine ring containing an alkyl chain with 1–4 carbons with a terminal halogen tosylate, mesylate, brosylate and triflate or a pyridine ring containing an alkyl chain with 1–4 carbons with a terminal aldehyde. Synthesis of matrix-polyamine/amino or imino pyridine extraction material is accomplished in two ways. The first way (Method A) converts the pyridine nitrogen of the picolylchloride hydrochloride salt from the acid form to the free base form using a strong base. In a preferred embodiment, potassium hydroxide is used as the base. The free base pyridine moiety of picolylchloride is then separated from the resulting salt before adding it to the matrix-polyamine base. In the second step the solution containing the free base pyridine moiety is added to the matrix-polyamine/methanol slurry. In a second embodiment triethylamine is used as the base. The triethylamine, the pyridine containing ligand and the matrix-polyamine material are all combined in a single reaction. In this embodiment the base is used to convert the pyridine containing ligand to the free base form and scavenge the acid formed during the reaction. The resulting 2-picolylamine polyamine is shown in Formula 1. The second way (Method B) involves the addition of pyridine 2-carboxaldehyde directly to silica-polyamine. A slurry of the silica polyamine and an organic solvent is heated for several hours at 60–90° C. Method B yields 2-pyrindine carboximine polyamine shown in Formula 2.

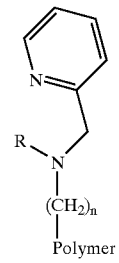

Formula 1 n = 0–2
R = H or Polymer

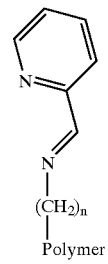

Formula 2 n = 0–2

Properties afforded the extraction material of the subject invention through this synthetic route include long material lifetime, high capacities for many heavy metal ions, selectivity for heavy metal ions with no interference from alkali or alkaline earth metals, the ability to extract these metal ions at high flow rates to very low levels, the ability to release these captured metals in highly concentrated solutions and most importantly selectivity for copper ions in the presence of other transition metals ions including ferric ions.

The advantageous properties of the subject material are revealed by performance defining tests. These tests can be divided into two broad categories, batch tests and flow tests. Batch tests are conducted b subjecting a predetermined amount of extraction material to a predetermined amount of feed solution for a set amount of time. Batch tests are used to determine capture kinetics, absorption isotherms, and pH profiles. Flow tests are conducted by flowing the feed solution through the extractant. Flow tests elucidate how the materials will perform under process conditions.

The gel containing the picolyl group was tested under flow conditions to determine its ability to separate copper from ferric iron. The feed solution, a simulated or leach solution, contained a 1:3 weight ratio of copper (II) to iron (III). The copper was added as copper (II) sulfate and the iron as iron (III) chloride, this formulation produced a chloride ion element in the solution as well as the heavy metals to further simulate leach solutions. The solution was used at its intrinsic pH of ~1.2. The feed solution was applied to a column containing silica-polyvinylamine/picolyl gel. The feed solution was allowed to flow through the column. A strip solution of sulfuric acid was used to release metal captured and held on the gel surface. The results of these preliminary flow tests revealed that the strip solution contained a ratio of approximately 100:1 copper to iron.

Early trials however revealed a significant chloride ion concentration in the strip solution. The gel has a very high binding affinity for copper, for the material made by Method A concentrated sulfuric acid or 4N acid heated to 70° C. is required to completely strip the copper from the gel. The material made by Method B can be stripped with 4N acid. A second series of trials was carried out with the objective of reducing the chloride ion content of the eluant or strip solution. To accomplish this saturated sodium sulfate solution was pumped through the column after it was loaded with copper from the simulated leach solution. The gel was then stripped with concentrated sulfuric acid and the strip solution was analyzed. The chloride ion content in the strip solution was below detection using ion chromatography. The sodium sulfate solution was analyzed for copper and was found to contain only low concentrations of the metal, for example, 23 ppm.

The matrix-polyamine/picolyl extraction material of the subject invention provides a basis on which to build an environmentally friendly, efficient system, to extract copper from acidic low copper concentration leach solutions and produce a highly concentrated high purity copper solution suitable for electrowinning. A three step high throughput system provides high purity copper from low concentration leach solutions. The first step of the process selectively extracts copper from leach solutions containing high concentrations of ferric ions with no added solution modifiers. The second step purges the extracted copper of chloride ions using a saturated solution of sodium sulfate or dilute sulfuric acid solution. Thirdly, the copper is stripped from the extraction material with sulfuric acid to yield a concentrated copper solution suitable for electrowinning. The column is ready to be reloaded after rinsing with water.

The economic benefits realized from this process are elimination of cost associated with solvent and ligand loss, predicted decreased energy consumption and predicted decreased processing time relative to the solvent extraction systems currently in use. Major environmental benefits are realized with the elimination of organic solvents from the process. Major economic advantages over currently available chelator resins are lower material cost and longer usable lifetimes.

Although the above discussion and the following examples focus upon a preferred embodiment of the extraction material of the subject invention, it is noted that the subject invention can be used to separate other transition metal ions from iron (III) ions. For example, ions, including but not limited to, cobalt (II), nickel (II) and zinc (II) can be selectively extracted in the presence of iron (III) ions using the extraction material of the subject invention.

The following examples are offered to further illustrate but not limit both the composition and the methods of the present invention. All percentages are by weight and all solvent mixture proportions are by volume unless otherwise noted.

EXAMPLE 1

Preparation of silica-polyvinylamine/2-picolylchloride (D2P-PVA) (Method A)

1. Amorphous silica gel (such as Crosfield, 90–105 microns ($\mu$m), 150 Å pore size with 375 meters$^2$/grams (g) surface area) (200 g) was mixed with 1N nitric acid (800 milliliters (mL)) in a 2 liter (L) three-necked round bottom flask. The contents were degassed for two minutes (min). After degassing, the flask was put into a heating well and a reflux condenser, a thermometer and a mechanical stirrer were attached to the flask. The contents of the flask were stirred and heated at 100° F. for 6 hours (hr). At the end of the 6 hr heating, the contents were cooled to room temperature and dumped into a 3 L sintered glass funnel. The gel was washed three times, 800 mL each, with deionized (DI) water. The gel was further washed with methanol three times (800 mL each). After most of the methanol was removed, the gel was spread in an open pan and air dried over night. The air-dried gel in the pan was placed in an oven and dried at 120° F. for 2–4 hr until constant weight was reached. Typical weight lost during this acid wash is about 6.4–7.1%.

2. The oven-dried gel (200 g) was placed in a 3 L sintered glass funnel. Moisturized air from a saturated solution of sodium bromide was passed through the gel from the outlet of the funnel. The flow rate of the moisturized air was regulated so that a fountain-like motion of the gel was observed. During this step, the weight of gel was checked every two hr until constant weight was obtained. Typical time required is about 12–16 hr and the average weight gain is 4.2–4.6%.

3. The hydrated gel (200 g) was then placed in a 2 L single-necked round bottomed flask. Heptane (704.9 mL, dried over molecular sieves) and bromopropyltrichloro silane (951 mL, freshly distilled) were well mixed in a 1 L Erlenmeyer flask and slowly poured into the round bottom flask via a funnel. Hydrochloric gas formed vigorously and the contents were gently swirled to let more hydrochloric gas evolve. After most of the gas evolution subsided, the flask was attached to a mechanical vacuum pump and degassed for 5 min. At the end of the 5 min, the flask was attached to a mechanical motor and spun slowly for 16 hr. After 16 hr of spinning, the contents were poured into a 3 L sintered glass funnel and the gel was washed successively with heptane, three times, methanol, three times, water, three times, and finally methanol, three times, (800 mL each). The gel was air dried in an open pan and then in the oven at 110° C. for 2 hr. Typical weight gain is about 16–30%.

4. Free base poly(vinyl amine) (PVA) (M.W. 5,000) (pH=13) in a 20.8% solution (400.00 g), and methanol (400 mL) were mixed in a 3 L round bottom flask. The bromopropyl gel (200.00 g) from step 3 was added to the flask. The flask was swirled to wet all of the bromopropyl gel and to form a slurry. The contents were degassed using an aspirator until the foaming stopped. After the degassing process the flask was attached to a motor and spun for a period of between 2 hr and 3 days at room temperature. At the end of the stirring process the contents was poured into a 3 L sintered glass funnel and washed with DI water three times, washed once with 4N sulfuric acid, three times with DI water, once with 4N ammonium hydroxide, three times with DI water and three times with methanol. The resulting PVA gel was air dried in an open pan. Typical weight gains are between 12 and 18 percent.

5. 2-picolylchloride hydrochloride (24.61 g) was dissolved in methanol (60 mL) in a 150 mL beaker. Powdered potassium hydroxide was dissolved in the 2-picolylchloride hydrochloride solution. The resulting precipitate was filtered using a Buchner funnel with filter paper. The filtrate was collected and transferred to a 500 mL 3-neck round bottom flask. Sixty mL of tetrahydrofurran (TBF) was added to the solution in the round bottom flask and swirled until it was well-mixed. The air-dried PVA gel (30.00 g) from the previous step was added to the flask. The flask was swirled to wet all of the PVA gel and form a slurry. The contents were degassed using an aspirator until the foaming stopped. After degassing, the flask was put into a heating well. A TEFLON paddle glass rod mechanical stirrer was fitted into the center neck. The pH was checked and adjusted to between 9–13 pH units, preferably 13, by manually adding, dropwise, 2N potassium hydroxide in methanol. While stirring the contents were heated to reflux. The pH was checked every hour and manually adjusted with 2 N potassium hydroxide in methanol as needed to maintain a pH of 9–13 while refluxing. After 9 hr of refluxing the contents were cooled to room temperature and poured into a 500 mL sintered glass funnel and washed with 120 mL each of methanol, three times, DI water, three times, concentrated sulfuric acid, once, DI water, three times, and methanol, three times. The resulting gel (D2P-PVA) was air dried in an open pan.

EXAMPLE 2
Preparation of silica-polyethyleneimine/2-picolylchloride (D2P-PEI)(Method B)

1. Complete steps 1–3 of Example 1.
2. Free base poly(ethyleneimine) (PEI) (M.W. 1,200) (pH=13) in a 50% solution (300.00 g), distilled water (100 mnL) and methanol (300 mL) were mixed in a 3 L round bottom flask. The bromopropyl gel (200.00 g) from step 3 was added to the flask. The flask was swirled to wet all of the bromopropyl gel and to form a slurry. The contents were degassed using an aspirator until the foaming stopped. After the degassing process the flask was attached to a motor and spun for a period of between 2 hr and 3 days at room temperature. At the end of the stirring process the contents was poured into a 3 L sintered glass funnel and washed with DI water three times, washed once with 4N sulfuric acid, three times with DI water, once with 4N ammonium hydroxide, three times with DI water and three times with methanol. The resulting PEI gel was air dried in an open pan. Typical weight gains are between 12 and 18 percent.
3. 2-picolylchloride hydrochloride (24.61 g) was dissolved in methanol (60 mL) in a 150 mnL beaker. Powdered potassium hydroxide was dissolved in the 2-picolylchloride hydrochloride solution. The resulting precipitate was filtered using a Buchner funnel with filter paper. The filtrate was collected and transferred to a 500 mL 3-neck round bottom flask. Sixty mL of tetrahydrofurran (THF) was added to the solution in the round bottom flask and swirled until it was well-mixed. The air-dried PEI gel (30.00 g) from the previous step was added to the flask. The flask was swirled to wet all of the PEI gel and form a slurry. The contents were degassed using an aspirator until the foaming stopped. After degassing, the flask was put into a heating well. A TEFLON paddle glass rod mechanical stirrer was fitted into the center neck. The pH was checked and adjusted to between 9–13 pH units, preferably 13, by manually adding, dropwise, 2N potassium hydroxide in methanol. While stirring the contents were heated to reflux. The pH was checked every hr and manually adjusted with 2 N potassium hydroxide in methanol as needed to maintain a pH of 9–13 while refluxing. After 9 hr of refluxing the contents were cooled to room temperature and poured into a 500 mL sintered glass funnel and washed with 120 mL each of methanol, three times, DI water, three times, concentrated sulfuric acid, once, DI water, three times, and methanol, three times. The resulting gel (D2P-PEI) was air dried in an open pan. Typical weight gains are between 10 and 35%.

EXAMPLE 3
Preparation of silica-polyallylamine/2-picolylchloride (D2P-PAA)(Method C)

1. Complete steps 1 and 2 of Example 1.
2. The hydrated gel (100 g) was then placed in a 1 L single-necked round bottomed flask. Heptane (~353 mL, dried over molecular sieves) was added to chloropropyl-trichloro silane (47 mL) in a 500 mL graduated cylinder to bring the total solution volume up to 400 mL. The graduated cylinder was agitated frequently to ensure mixing of the reagents. The contents of the graduated cylinder were slowly poured into the round bottomed flask via a funnel. Hydrogen chloride gas formed vigorously and the contents were gently swirled to allow more hydrogen chloride gas to evolve. After most of the gas evolution subsided, the flask was attached to a vacuum aspirator and degassed for 5 min. At the end of the 5 min the flask was attached to a mechanical stirrer and spun slowly (60 rpm) for 16 hr. After 16 hr of spinning, the contents were placed on a rotovap in a 100° C. water bath until the gel was dry. The gel was then poured into a 3 L sintered glass funnel and the gel was washed successively three times with methanol, three times with DI water, and three times methanol (400 mL each). The gel was air dried in an open pan overnight and then in an oven at 110° C. for 2 hr. The weight gain is typically 14–20%.
3. Free base poly(allyl amine) (PAA) (M.W. 11,400) (pH=11.5) in a 15.4% solution (131 mL), and methanol (69 mL) were mixed in a 500 mL round bottomed flask and swirled until well mixed. The chloropropyl gel (50.00 g), from the previous step, was added to the flask. The contents were swirled to wet all of the chloropropyl gel and to form a slurry. The contents were degassed using a vacuum aspirator until the foaming stopped. After degassing, the flask was attached to a rotary stirrer, placed in a 50° C. oil bath, and stirred for 3 days. At the end of the stirring process the contents were poured into a 500 mL sintered glass funnel and washed three times with DI water, once with 4N sulfuric acid, three times with DI water, once with 4N ammonium hydroxide, three times with DI water, and two times with methanol (200 mL each). The resulting PAA gel was air dried in an open pan overnight. Typical weight gains are between 11–18%.
4. 2-picolylchloride hydrochloride (5.27 g) was dissolved in methanol (9 mL) in a 100 mL round bottomed flask. Triethylamine (11 mL) was added to the flask and the contents were swirled to mix. PAA gel (5.00 g) from the previous step was added to the flask and gently swirled to wet the gel and form a slurry. The contents were degassed using a vacuum aspirator until the evolution of small bubbles stopped. After degassing, the flask was attached to a rotary stirrer, placed in a 50° C. oil bath, and stirred for 4 hr. After 4 hr the pH of the solution was checked and adjusted to 10.1 with 8 N sodium hydroxide. The slurry was replaced on the stirrer in the oil bath and stirring continued for a total of 3 days. At the end of the stirring process the contents were poured into a 100 mL sintered glass funnel and washed three times with methanol, three times with DI water, once with conc. sulfuric acid, three times with DI water, and two times with methanol (200 mL each). The resulting D2P-PAA gel was air dried in an open pan overnight. Typical weight gains are between 10–20%.

EXAMPLE 4
Preparation of silica polyvinylamine/2-pyridine carboxaldehyde (2DPI-PVA).

In a 3-neck round bottom flask 10 g of PVA gel from step 4 of Example 1 was mixed with 40 mnL of methanol. The contents were swirled until all of the gel was wetted and a slurry was formed. The resulting slurry was degassed for 2 min under vacuum aspiration (until the release of small bubbles ceased). The round bottom flask was then fitted to a reflux condenser, a glass rod stirred fitted with TEFLON paddle and a nitrogen source. The headspace of the flask was purged with nitrogen gas and nitrogen was passed through the reaction vessel throughout the reaction. The heating mantle and condenser cooling water were started and the temperature of the reactants brought up to the reflux temperature. 4.3 mL of pyridine carboxaldehyde was added to the contents of the flask and the reaction carried out at reflux for 2 hours. After cooling the resultant slurry was drained by vacuum filtration using a fritted glass funnel. Using the same vacuum filtration set-up the gel was rinsed 3 times with 40 mL of methanol; 3 times with 40 mL of DI water, 1 time with 40 mL of 4 N sulfuric acid, three times with 40 mL of DI water, and 2 times with 40 mL of methanol. The resulting buff colored gel (2PCI-PVA) was then air dried overnight. Typical weight gains 4 were between 9 and 12%.

EXAMPLE 5
Separation of copper (II) from iron (III).

Gel (2.25 g) as prepared in Example 1 was packed into a plastic column (1.1 centimeter (cm) (diameter)×4 cm (length)). A challenge solution of 3.93 g of copper sulfate and 14.52 g of ferric chloride dissolved in 1 L of deionized water was pumped through the column at a flow rate of 2 column volumes/min. The challenge solution (70 mL) was pumped through the column followed by DI water (30 mL) and the flowthrough (100 mL) was collected for analysis. Sequestered metal was eluted from the column by pumping concentrated sulfuric acid (5 mL) through the column at a flow rate of 2 column volumes/min followed by DI water (15 mL) and the eluant (20 mL) was collected for analysis.

Figure 2:
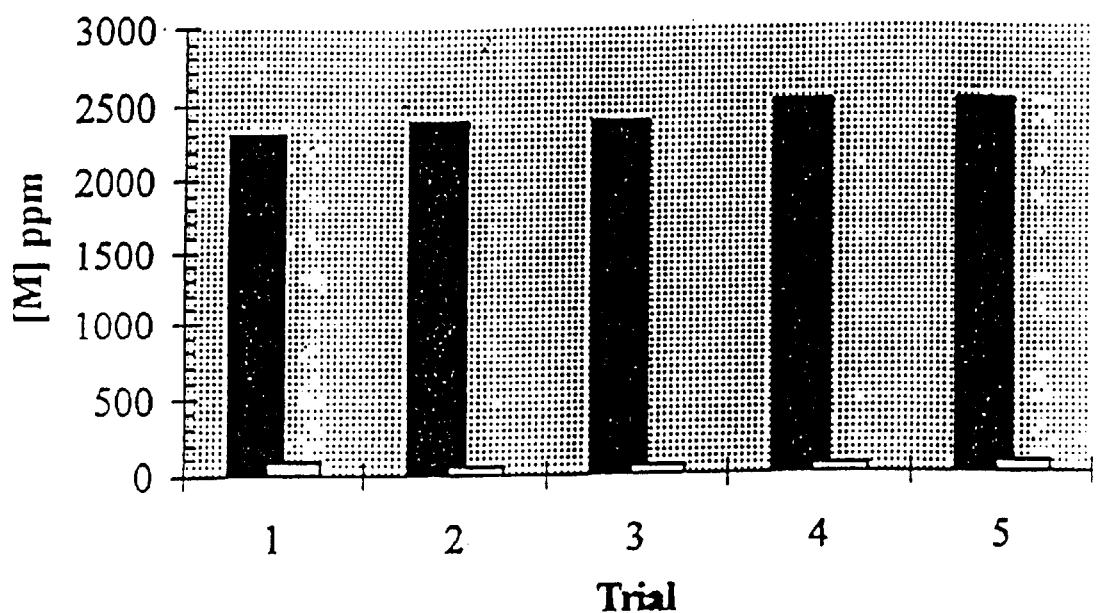
FIG. 2 shows the concentration of copper (II) and iron (III) in the strip solution of the column used in FIG. 1. □ Fe(III), ■ Cu(II)

Iron (III) flows through the column while copper (II) is captured by the column and released into the eluant. FIG. 1 shows the flowthrough contains the bulk of the iron (III) while FIG. 2 shows most of the copper appears in the eluant. Typical separation factors are 400–1,100 depending upon conditions. The separation factor was derived from the following equation $D_{Cu}/D_{Fe}$ where $D_{Cu}$=Cu adsorbed/Cu remaining in solution and $D_{Fe}$=Fe adsorbed/Fe remaining in solution.

The simulated mine leachate solution contained approximately 1000 parts per million (ppm) $Cu^{++}$ and approximately 3000 ppm $Fe^{+-+}$. Because the column was rinsed with deionized water which was added to the flowthrough prior to analysis, the maximum concentration of ions in the flowthrough was approximately 2100 ppm $Fe^{+++}$ and approximately 700 ppm $Cu^{++}$.

EXAMPLE 6
Separation of copper (II) from iron (III) at low concentrations.

The subject matrix-polyamine based material was compared to a commercially available resin (Dowex XFS-43084) and is more effective at low copper ion concentrations. The gel of Example 1 having a particle size of 90–150 μm (90–150 μm D2P-PVA), gel made using the method of Example 1 and having a particle size of 250–500 μm (250–500 μm D2P-PVA) and XFS 43084 (XFS) a Dowex resin made expressly for the selective extraction of copper (II) were compared in batch tests. Bulk XFS contains a large range of particle sizes with the bulk being above 500 μm. For the purpose of uniformity the bulk resin was mechanically sieved and the fraction of particles between 250 μm and 500 μm were extracted. The XFS was weighed out for these experiments in the moist dry state in which it was received. The subject extraction material was also weighed in the air-dried state. 250–500 μm XFS, 90–105 μm subject gel and 250–500 μm subject gel (0.2000 g (±0.0002 g)) were weighed out into glass screw top vials. 20 mL of a solution containing various concentrations of iron (III) only, copper (II) only, and of iron (III) copper (II) mix pH adjusted to 2.0 were added using a volumetric pipette. Table 1 contains the metal ion concentrations in the test solutions.

TABLE 1

| Cu in Cu:Fe Mix | Fe in Cu:Fe Mix | Cu Only | Fe Only |
| --- | --- | --- | --- |
| 0.05 M | 0.15 M | 0.20 M | 0.20 M |
| 0.025 M | 0.075 M | 0.10 M | 0.10 M |
| 0.013 M | 0.038 M | 0.050 M | 0.050 M |
| 0.0063 M | 0.019 M | 0.025 M | 0.025 M |
| 0.0031 M | 0.0094 M | 0.013 M | 0.013 M |
| 0.0016 M | 0.0047 M | 0.0063 M | 0.0063 M |
| 0.00078 M | 0.0023 M | 0.0031 M | 0.0031 M |

The vials were placed on a shaker for 24 hr to ensure constant agitation. At that time an aliquot of the metal ion solution was removed for analysis and preserved with trace metal grade nitric acid. This test was carried out in triplicate to ensure reliability of the data. The collected samples were then diluted to bring the metal concentrations into a range which could be analyzed by FAA spectroscopy. After standing 24 hr at an elevated pH (2.0) the high iron (III) concentration solutions began to form iron (III) precipitates. Negative values appear because, at the higher iron (III) concentrations, more iron (III) precipitated out from the control solutions than from the samples containing the extraction materials.

Figure 3:
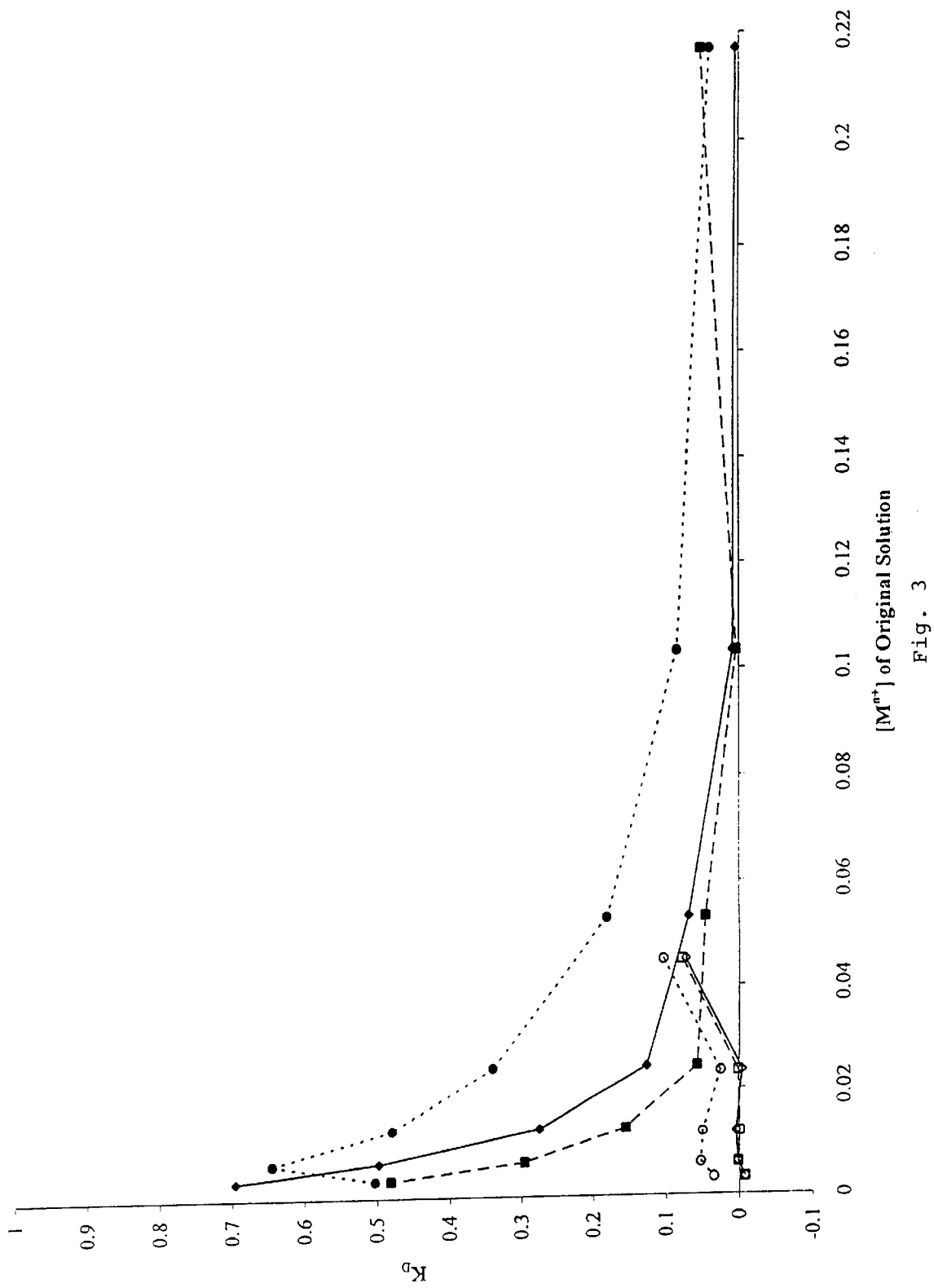
FIG. 3 shows the molar fraction of metal ions adsorbed from solution by the extraction material of the subject invention against the original metal ion concentration of that solution compared with a polystyrene resin produced by Dow Chemical (XFS 43084). ● XFS Cu, ○ XFS Fe, ■ 250–500 µmD2P-PVACu, □ 250–500 µmD2P-PVAFe, ◆ 90–105 µm D2P-PVA Cu, ◇ 90–105 µm D2P-PVA Fe

FIG. 3 shows that XFS is efficient at high copper concentrations but its effectiveness drops off as the copper concentration decreases. The matrix-based polyamine material of the subject invention however effectively removes copper from mixed metal solutions at both high and low concentrations.

EXAMPLE 7
Separation of copper (II) from Fe (III) at low pHs.

Figure 4:
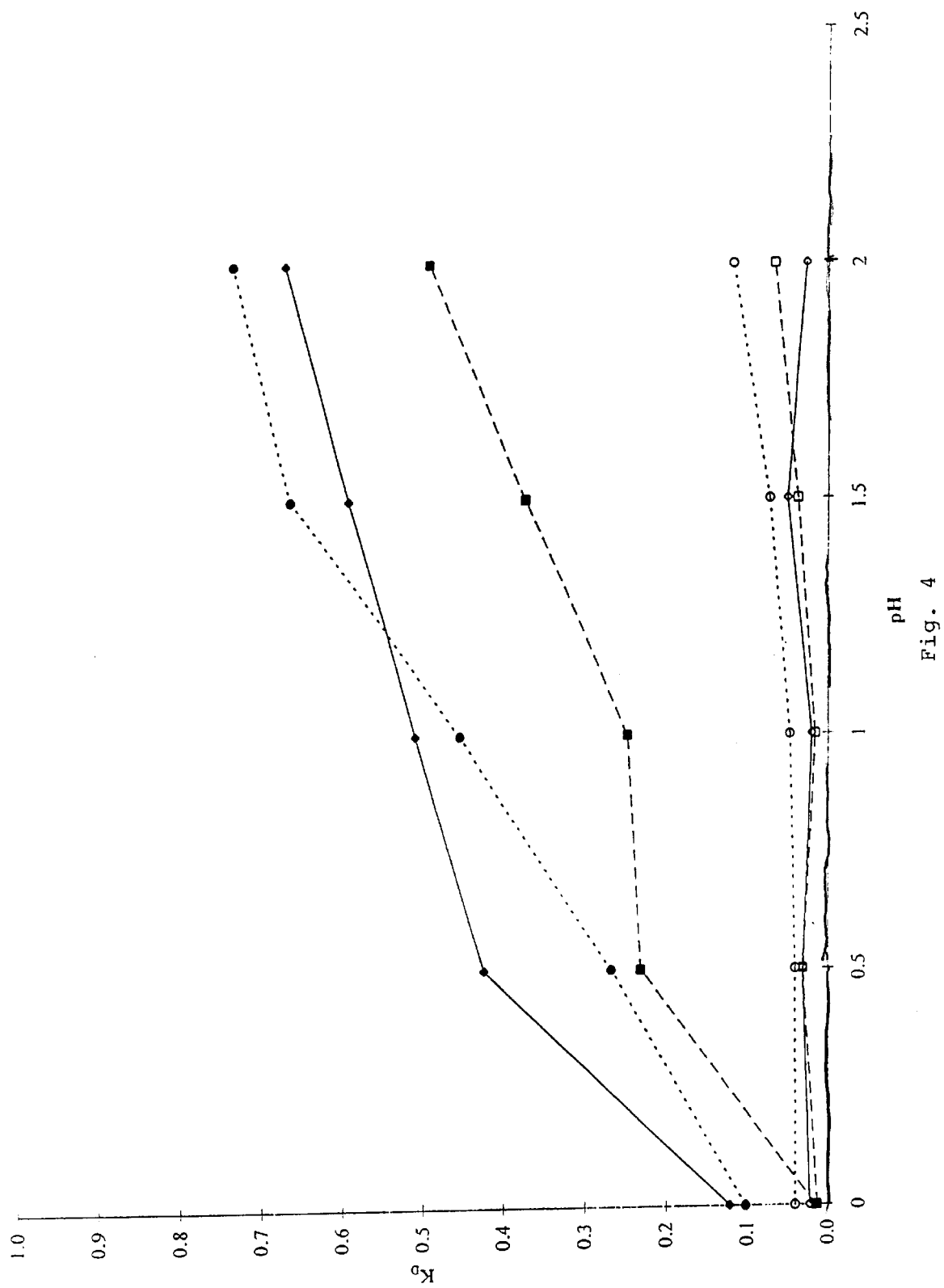
FIG. 4 shows the adsorptive profiles of the copper selective extraction material of the subject invention compared with Dow Chemical (XFS 43084) over a range of pHs. ◆ 90–105 µmD2P-PVA Cu, ◇ 90–150 µm S2P-PVAFe, ■ 250–500 µm D2P-PVA Cu, □ 250–500 µm D2P-PVA Fe, ● XFS Cu, ○ XFS Fe

0.2000 g (±0.0002 g) quantities of the extraction material of Example 1 having a particle size of 90–150 μm (90–150 μm D2P-PVA), extraction material made by the method of Example 1 and having a particle size of 250–500 μm (250–500 μm D2P-PVA) and XFS resin (Dowex) (XFS) were placed in glass screw top vials. 20 mL aliquots of a 0.0031 M $Cu^{++}$ and 0.00934 M $Fe^{+++}$ solution were added to the vials using a volumetric pipette. The pHs of the solutions were adjusted to 0.0, 0.5, 1.0, 1.5, 2.0 and 2.5 using concentrated sulfuric acid or 8N sodium hydroxide prior to being placed into the vials. The vials were placed on a shaker to ensure constant agitation. An aliquot of the metal ion solution was removed for analysis and preserved with trace metal grade nitric acid after 24 hr. Samples were run in triplicate to ensure reliability of the data. Collected samples were diluted to bring the metal concentration into a range which could be analyzed by FAA spectroscopy. pH 2.5 samples was discounted because after 4 hr the iron (III) had significantly precipitated from solution. FIG. 4 shows that at low pH the extraction material of the subject invention is effective in separating $Cu^{++}$ from $Fe^{+++}$ and at pH 0.5 the 90–150 μm gel is superior to the Dowex resin. This is important not only in mining process but also in industry where waste streams can be very acidic. If valuable metals such as copper can be extracted before the pH is adjusted they will not have to be recovered from the heavy metal sludge which can form on pH adjustment making recovery easier.

EXAMPLE 8
Useable gel lifetime.

Longevity tests were carried out in the following manner. 5 cubic centimeter column were loaded with the gel prepared in Example 1 (D2P-PVA) or Dowex XFS resin (XFS). 100 mL of DI water was pumped through each column to wet the material. Then, 70 mnL of a 1000 ppm $Cu^{++}$: 3000 ppm $Fe^{+++}$, from copper sulfate and ferric chloride, solution was pumped through the column at a flow rate of 2 column volumes/min and the flowthrough was collected. 30 mL of DI water was then pumped through each column to rinse the column. The rinse water was collected along the flowthrough. The collected solutions were preserved with trace metal grade nitric acid and diluted to enable FAA spectroscopic analysis for $Cu^{++}$ and $Fe^{+++}$. The columns were then stripped of metal by pumping 4 mnL of sulfuric acid through the column. The XFS column was stripped with 8N $H_2SO_4$ while the D2P-PVA column was stripped with concentrated acid. The strip solution as well as 16 mL of DI water were collected and later diluted for analysis for $Fe^{++}$ and $Cu^{+++}$ by FAA spectroscopy. The columns were then rinsed with 100 mL of DI water. The rinse water was discarded.

When not collecting capacity samples, the columns were attached to a six-way manifold equipped with solenoid valves wired to a computer containing software to carry out the following cycle. The pump was adjusted to produce a flow rate of 10 column volumes/min. The challenge solution was pumped through for 6 seconds (sec) followed by DI water for 10 sec. Concentrated sulfuric acid was pumped through the columns for 5 sec. A 36 sec rinse with DI water completed the cycle.

Figure 5:
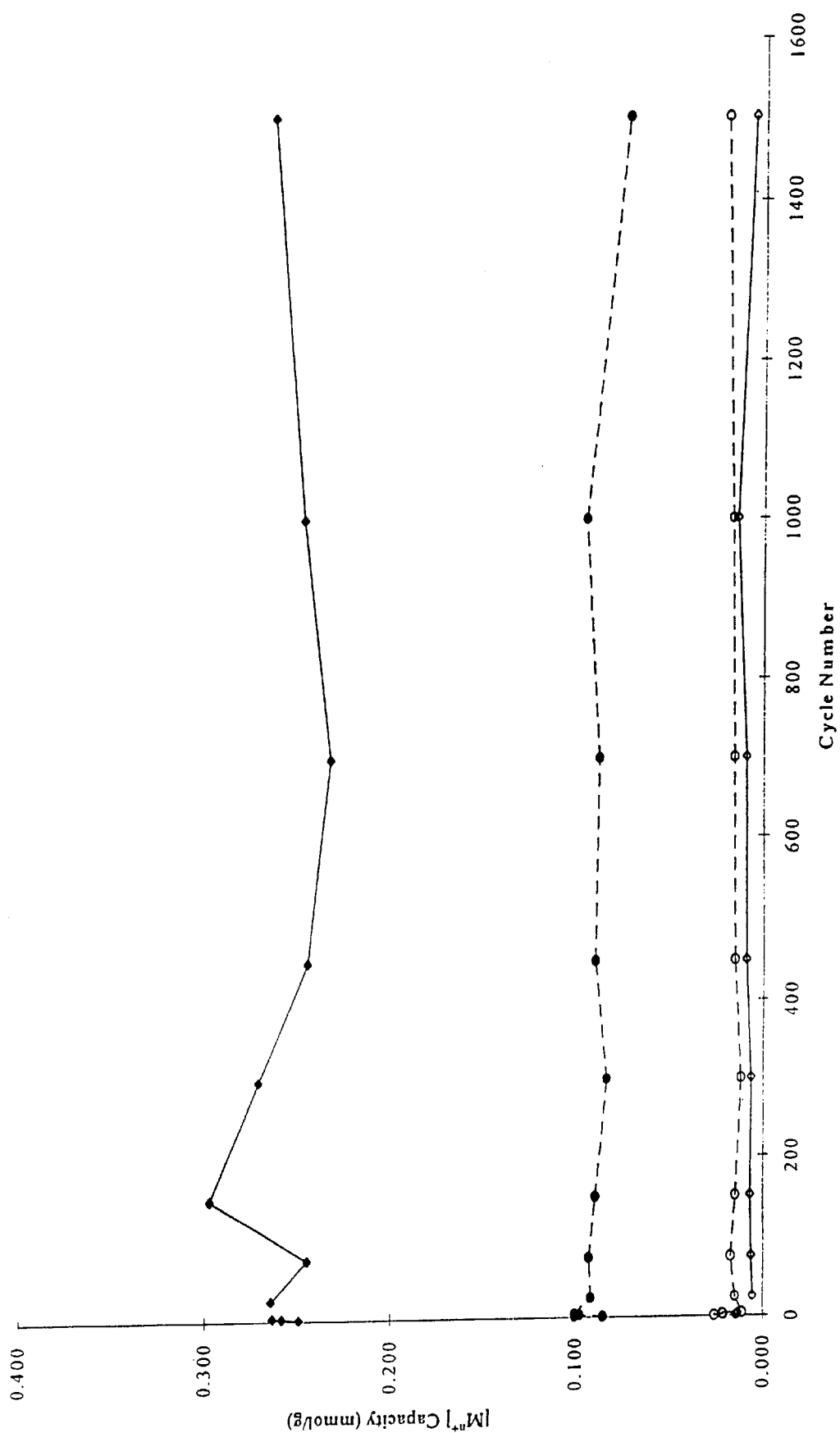
FIG. 5 shows copper (II) and iron (III) capacity (mmol/g) over an extended period of use in a column-type system. Capacities were tested at a flow rate of 2 bed volumes/min. ◆ D2P-PVA Cu, ◇ D2P-PVA-Fe, ● XFS Cu, ○ XFS Fe

The metal ion capacity was checked after 25, 75, 150, 300, 450, 700, 1000, and 1500 cycles. The absorbence data from the FAA was converted to millimoles of metal ion per g of extractive material and plotted. FIG. 5 shows that at 1500 cycles both materials seem to have retained their capacity for copper (II) and rejection for iron (III). It is also clear from FIG. 5 that at a flow rate of 2 column volumes/min 90–105 micron D2P-PVA has a higher copper (II) capacity than XFS. D2P-PVA also has a greater separation power demonstrated by the distance between the copper (II) and iron (III) lines of the graph.

EXAMPLE 9

Flow capacity.

Flow capacity tests indicate how a material may perform in a process setting. Flow capacity tests were conducted with the procedure outlined in paragraph one of Example 7. The results of these test for five materials are presented in Table 2.

TABLE 2

| Material | $Cu^{++}$ Capacity (mmol/g) | $Fe^{+++}$ Capacity (mmol/g) | Separation Factor |
|---|---|---|---|
| 90–105 μM D2P-PVA | 0.369 | 0.006 | 1046.8 |
| 250–500 μm XFS | 0.187 | 0.021 | 60.0 |
| 90–105 μm D2P-PEI | 0.182 | 0.008 | 130 |
| 90–105 μm 2PCl-PVA | 0.253 | 0.006 | 429.3 |
| 250–500 D2P-PVA | 0.109 | 0.015 | 32.9 |

The separation factor was defined as Separation Factor= $q_e^{Cu}/C_e^{Cu}/q_e^{Fe}/C_e^{Fe}$ where $q_e^{Cu}$, $q_C^{Fe}$ are the amount of copper and iron adsorbed onto the extractant at equilibrium respectively and $C_e^{Cu}$, $C_e^{Fe}$ are the amount of copper and iron in solution at equilibrium respectively.

It is understood that the foregoing examples are merely illustrative of the present invention. Certain modifications of the compositions and/or methods employed may be made and still achieve the objectives of the invention. Such modification are contemplated as within the scope of the claimed invention.

What is claimed is:

1. An extraction material for separating at least one transition metal ion species from iron (III) in a solution, said extraction material comprising a matrix-polyamine base and a pyridine functional group, said matrix-polyamine base comprising the reaction product of a polyamine with a short chain hydrocarbylsilyl formed from first silanizing a matrix surface by hydrating said surface and reacting said hydrated surface with a short chain trifunctional silane having (a) hydrocarbon substituents containing 1–6 carbon atoms, (b) trifunctional leaving groups providing sites for covalently bonding said hydrocarbylsilyl to said matrix surface through Si—O bonds, and (c) terminal leaving groups providing sites for covalently bonding said polyamine to said hydrocarbylsilyl through N-hydrocarbyl bonds; and secondly reacting said polyamine with said hydrocarbylsilyl formed from the silanization of said hydrated surface so as to form an aminohydrocarbyl polymer covalently bound to said matrix surface, said aminohydrocarbyl polymer having non-crosslinked amino groups multisite bound to said hydrocarbylsilyl.

2. The extraction material of claim 1, wherein said silane has trifunctional substituents selected from the group consisting of trichloro, trimethoxy and triethoxy substituents.

3. The extraction material of claim 1, wherein said silane has terminal leaving group substituents selected from the group consisting of halogens, tosylate, mesylate, brosylate and triflate.

4. The extraction material of claim 1, wherein said hydrocarbon substituents are short chain aliphatic hydrocarbons having 1–6 carbon atoms.

5. The extraction material of claim 1, wherein said silane has trifunctional substituents selected from the group consisting of trichloro, trimethoxy and triethoxy substituents; said silane has terminal leaving group substituents selected from the group consisting of halogens, tosylate, mesylate, brosylate and triflate; and said hydrocarbon substituents are short chain aliphatic hydrocarbons having 1–6 carbon atoms.

6. The extraction material of claim 5, wherein said silane is bromopropyltrichloro silane.

7. The extraction material of claim 5, wherein said silane is chlorpropyltrichloro silane.

8. The extraction material of claim 1, wherein polyamine is polyvinylamine.

9. The extraction material of claim 8, wherein said pyridine functional group is 2-picolylamine.

10. The extraction material of claim 8, wherein said pyridine functional group is 2-pyridine carboxmine.

11. The extraction material of claim 1, wherein said polyamine is polyethyleneimine.

12. The extraction material of claim 11, wherein said pyridine functional group is 2-picolyamine.

13. The extraction material of claim 11, wherein said pyridine functional group is 2-pyridine carboximiine.

14. The extraction material of claim 1, wherein said polyamine is polyallylamine.

15. The extraction material of claim 14, wherein said pyridine functional group is 2-picolyamine.

16. The extraction material of claim 14, wherein said pyridine functional group is 2-pyridine carboximine.

17. The extraction material of claim 1, wherein said pyridine functional group is a pyridine alkylamine with an alkyl chain of about 1–4 carbons.

18. The extraction material of claim 1, wherein said pyridine functional group is a pyridine alkyl aldehyde with an alkyl chain about 1–4 carbons.

19. The extraction material of claim 1, wherein said pyridine functional group is 2-picolylamine.

20. The extraction material of claim 1, wherein said pyridine functional group is 2-pyridine carboximene.

21. The extraction material of claim 1, wherein said silane is bromopropyltrichloro silane, said polyamine is polyvinylamine and said pyridine functional group is 2-picolyamine.

22. The extraction material of claim 1, wherein said silane is chloropropyltrichloro silane, said polyamine is polyvinylamine and said pyridine functional group is 2-picolyamine.

23. The extraction material of claim 1, wherein said silane is bromopropyltrichloro silane, said polyamine is polyvinylamine and said pyridine functional group is 2-pyridine carboxmine.

24. The extraction material of claim 1, wherein said silane is chloropropyltrichloro silane, said polyamine is polyvinylamine and said pyridine functional group is 2-pyridine carboximine.

25. The extraction material of claim 1, wherein said silane is bromopropyltrichloro silane, said polyamine is polyethyleneimine and said pyridine functional group is 2-picolyamine.

26. The extraction material of claim 1, wherein said silane is chloropropyltrichloro silane, said polyamine is polyethyleneimine and said pyridine functional group is 2-picolyamine.

27. The extraction material of claim 1, wherein said silane is bromopropyltrichloro silane, said polyamine is polyethyleneimine and said pyridine functional group is 2-pyridine carboximine.

28. The extraction material of claim 1, wherein said silane is bromopropyltrichloro silane, said polyamine is polyallylamine and said pyridine functional group is 2-picolyamine.

29. The extraction material of claim 1, wherein said silane is chloropropyltrichloro silane, said polyamine is polyallylamine and said pyridine functional group is 2-picolyamine.

30. The extraction material of claim 1, wherein said silane is bromopropyltrichloro silane, said polyamine is polyallylamine and said pyridine functional group is 2-pyridine carboximine.

31. The extraction material of claim 1, wherein said silane is chloropropyltrichloro silane, said polyamine is polyallylamine and said pyridine functional group is 2-pyridine carboximine.

32. The extraction material of claim 1, wherein said at least one transition metal ion species is copper (II).

33. A method of making an extraction material for separating at least one transition metal ion species from iron (III) ions in a solution comprising the steps of:
   a) providing a matrix having a surface that is silanizable;
   b) hydrating said surface of said matrix with a monolayer of water;
   c) silanizing said hydrated surface of said matrix with a silane having short chain hydrocarbyl substituents containing 1–6 carbon atoms and terminal leaving groups so as to hydrocarbylate said matrix surface, said terminal leaving groups providing sites for covalently bonding a polyamine to the hydrocarbylsilyil through N--hydrocarbyl bonds;
   d) reacting said polyamine with said hydrocarbylated matrix surface after silanization is complete to form an aminohydrocarbyl polymer covalently bound to the hydrocarbylated extraction material surface with said aminohydrocarbyl polymer having non-crosslinked amino groups multisite bound to said hydrocarbylsilyl; and
   e) reacting a pyridine functional group with said aminohydrocarbyl polymer.

34. The method of claim 33, wherein said silane has trifunctional substituents selected from the group consisting of trichloro, trimethoxy and triethoxy substituents.

35. The method of claim 33, wherein said silane has terminal leaving group substituents selected from the group consisting of halogens, tosylate, mesylate, brosylate and triflate.

36. The method of claim 33, wherein said hydrocarbon substituents are short chain aliphatic hydrocarbons having 1–6 carbon atoms.

37. The method of claim 33, wherein said silane has trifunctional substituents selected from the group consisting of trichloro, trimethoxy and triethoxy substituents; said silane has terminal leaving group substituents selected from the group consisting of halogens, tosylate, mesylate, brosylate and triflate; and said hydrocarbon substituents are short chain aliphatic hydrocarbons having 1–6 carbon atoms.

38. The method of claim 33, wherein said silane is bromopropyltrichioro silane.

39. The method of claim 33, wherein said silane is chloropropyltrichloro silane.

40. The method of claim 33, wherein said polyamine is polyvinylamine.

41. The method of claim 40, wherein said pyridine functional group is picolychloride hydrochloride.

42. The method of claim 40, wherein said pyridine functional group is pyridine 2-carboxaldehyde.

43. The method of claim 33, wherein said pyridine functional group is picolylchloride hydrochloride.

44. The method of claim 43, wherein said pyridine functional group is a pyridine ring, with an alkyl chain of about 1–4 carbons with a terminal halogen selected from the group consisting of tosylate, mesylate, brosylate and triflate.

45. The method of claim 43, wherein said pyridine functional group is a pyridine ling with an alkyl chain of about 1–4 carbons with a terminal aldehyde.

46. The method of claim 33, wherein said pyridine functional group is pyridine 2-carboxaldehyde.

47. The method of claim 46, wherein said pyridine functional group is picolylchloride hydrochloride.

48. The method of claim 46, wherein said pyridine functional group is pyridine 2-carboxaldehyde.

49. The method of claim 33, wherein said polyamine is polyethyleneimine.

50. The method of claim 33, wherein said pyridine functional group is picolylchioride hydrochloride.

51. The method of claim 33, wherein said pyridine functional group is pyridine 2-carboximine.

52. The method of claim 33, wherein said polyamine is polyallylamine.

53. The method of claim 33, wherein said at least one transition metal ion species is copper (II).

* * * * *

UNITED STATES PATENT AND TRADEMARK OFFICE
CERTIFICATE OF CORRECTION

PATENT NO. : 6,576,590 B2                                                                 Page 1 of 1
DATED      : June 10, 2003
INVENTOR(S) : Edward Rosenberg and Robert J. Fischer It is certified that error appears in the above-identified patent and that said Letters Patent is hereby corrected as shown below:

Column 16,
Line 47, "47. The method of claim 46" should read -- 47. The method of claim 52 --.
Line 49, "48. The method of claim 46" should read -- 48. The method of claim 52 --.
Line 53, "50. The method of claim 33" should read -- 50. The method of claim 49 --.

Signed and Sealed this

Eleventh Day of May, 2004

JON W. DUDAS
*Acting Director of the United States Patent and Trademark Office*